United States Patent [19]

Spicer et al.

[11] 3,912,825

[45] *Oct. 14, 1975

[54] EDIBLE FUNGAL PROTEIN FROM NON-TOXIC PENICILLIUM

[75] Inventors: Arnold Spicer, Iver Heath; Gerald L. Solomons, High Wycombe, both of England

[73] Assignee: Ranks Hovis McDougall Limited, London, England

[ * ] Notice: The portion of the term of this patent subsequent to Feb. 11, 1992, has been disclaimed.

[22] Filed: June 24, 1974

[21] Appl. No.: 482,134

Related U.S. Application Data

[60] Division of Ser. No. 333,788, Feb. 20, 1973, Pat. No. 3,865,951, which is a continuation-in-part of Ser. No. 116,684, Feb. 18, 1971, abandoned.

[30] Foreign Application Priority Data

Feb. 25, 1970  United Kingdom................. 8977/70
Feb. 25, 1970  United Kingdom................. 8978/70

[52] U.S. Cl............................. 426/656; 260/112 R
[51] Int. Cl.$^2$............................................ A23J 1/00
[58] Field of Search ....... 426/60, 204, 61, 148, 656; 195/81, 53, 35; 260/112 R

[56] References Cited

UNITED STATES PATENTS 3,151,038   9/1964   Gray................................ 195/81 X

*Primary Examiner*—James R. Hoffman
*Attorney, Agent, or Firm*—Stevens, Davis, Miller & Mosher

[57] ABSTRACT

Penicillin free edible protein-containing substance suitable for human consumption is produced by incubating and proliferating, under aerobic conditions, a non-toxic and non-penicillin producing strain of *Penicillium notatum* or *Penicillium chrysogenum* or a variant or mutant thereof in a culture medium containing essential growth-promoting nutrient substances, of which carbon in the form of assimilable carbohydrate constitutes the limiting substrate in proliferation, and separating from the assimilable carbohydrate exhausted medium the proliferated organism which is penicillin free and which constitutes the edible protein-containing substance suitable for human consumption possessing a high net protein utilization value of at least 70 based on alpha-amino nitrogen.

1 Claim, No Drawings

EDIBLE FUNGAL PROTEIN FROM NON-TOXIC PENICILLIUM

This is a division of application Ser. No. 333,788, filed, Feb. 20, 1973 and now U.S. Pat. No. 3,865,951 which is a continuation of application Ser. No. 116,684, filed Feb. 18, 1971, now abandoned.

The present invention relates to a process for the production of edible protein-containing substances and has particular reference to the production of fungal protein by microbial action.

British Application No. 53312/66, now British Pat. No. 1210356, relates to a process for the production of an edible protein-containing substance which comprises incubating and proliferating, under aerobic conditions, an organism which is a nontoxic strain of a microfungus of the class Fungi Imperfecti, in a culture medium containing essential growth-promoting nutrient substances, of which carbon in the form of assimilable carbohydrate constitutes the limiting substrate in proliferation, and separating from a assimilable carbohydrate exhausted medium the proliferated organism which constitutes the edible protein-containing substance.

It is an object of the present invention to provide fungal mycelium as an unsupplemented protein source which possesses a high net protein utilisation value on rat assays of at least 70. based on the $\alpha$-amino nitrogen.

According to the present invention there is provided a process for the production of an edible protein-containing substance which comprises incubating and proliferating, under aerobic conditions, a non-toxic strain of *Penicillium notatum* or *Penicillium chrysogenum* or a variant or mutant thereof, in a culture medium containing essential growthpromoting nutrient substances, of which carbon in the form of assimilable carbohydrate constitutes the limiting substrate in proliferation, and separating from the assimilable carbohydrate exhausted medium the proliferated organism which constitutes the edible protein-containing substance.

The separated proliferated organism which constitute the edible protein-containing substance may be incorporated into a foodstuff for human or animal consumption.

The substrate employed in the incubation stage may be of vegetable origin for example wheat feed, hydrolysed potato, molasses, bagasse waste and/or citrous waste. Alternatively a substrate of animal origin comprising whey may be employed.

Our strain of *Penicillium notatumchrysogenum* C1 which is described together with variants and mutants thereof in British Application No. 8978/70, now British Pat. No. 1,331,472, has been deposited at the Commonwealth Mycological Institute, Kew, and assigned the number I.M.I.138291.

It has the following morphological characteristics

| Medium | Malt Extract Agar (Oxoid) | Czapek-Dox (modified) Agar (Oxoid) |
|---|---|---|
| Growth conditions Colony Characteristics | 10 days 25°C | 10 days 25°C |
| Rate of growth | 5.0–5.5 cm diameter in 10 days | 4.5–5.0 cm diameter in 10 days |
| Character of growth | Close textured, velvety No radial furrows | Close textured, velvety Radial furrows in some cases |
| Margin | Entire. 2–3 mm white, non-sporing except where colonies meet | Entire. 1–2 mm white, non-sporing except where colonies meet |
| Amount of sporulati Color | Dense Blue-green to bright green | Dense Blue-green |
| Exudate | Absent | Present, clear yellow, mainly in separated colonies |
| Odor | Very little | Very little |
| Reverse | Yellow to yellow-brown, no pigment visible in medium | Bright yellow with abundant pigment diffusing into medium |
| Conidial Stage | Very similar on both media | |
| Penicilli: | Biverticillate asymmetrical. Length (branch to phialides) 16–35µ | |
| Conidiophore: | At colony margin arising from basal felt, smooth-walled, 200–300µ approx. Width 2–4µ | |
| Branches: | One or two branches usually, arising at same point on main stem, asymmetric. Length 9–20µ, width 2–4µ | |
| Metulae: | Groups of 2–5, usually 3. Compact whorl, hot divergent, length 3–10µ, width 2–4µ | |
| Phialides: | Groups of 4–6, typical bottle-shaped cells. Lengths 4.5–6.0µ, width 2.0–3.0µ | |
| Conidia: | Forming tangled chains up to 120µ in length, usually 80µ, Subglobose, 3–3.5µ × 2.5–3µ smooth walled, yellowish green in mass | |

The penicilli are intermediate between P. chrysogenum and notatum in complexity with slightly elliptical spores like P. chrysogenum.

Our British Application No. 8978/70 also describes specifically two variants of our strain of *Penicillium notatum-chrysogenum* C1 namely I.113 and I.195 deposited with the Commonwealth Mycological Institute and assigned the numbers I.M.I.142385 and I.M.I.142386 respectively and two mutants of said strain C1 namely I.64 and I.156 likewise deposited with the Commonwealth Mycological Institute and assigned the numbers I.M.I.142383 and 142384 respectively.

I. 113 (I.M.I 142,385) and I. 195 (I.M.I. 142,386) having the following morphological characteristics:

| I. 113 Medium | Malt Extract Agar (Oxoid) | Czapek-Dox (modified) Agar (Oxoid) |
|---|---|---|
| Growth conditions Colony characteristics | 10 days at 25°C | 10 days at 25°C |
| Rate of growth | 5.0–6.0 cm in 10 days | 4.5–50 cm in 10 days |
| Character of growth | Floccose at first, tending to become velvety. Light radial furrows. | Floccose particularly in center. Four radial furrows. |
| Margin | Entire | Entire |
| Amount of sporulation | Sparse | Sparse |
| Color | White to pale green | White to pale lemon |
| Exudate | Absent | Absent |
| Odor | Very little | Very little |
| Reverse | Yellow-brown no pigment in medium | Bright yellow with abundant pigment in medium |
| Conidial stage | Similar on both media | |
| Penicilli: | Biverticillate asymmetric. Length (branch to phialide) 20–50µ | |
| Conidiophore: | Smooth walled, approx. 200µ Width 2–4µ | |

-Continued

| I. 113 Medium | Malt Extract Agar (Oxoid) | Czapek-Dox (modified) Agar (Oxoid) |
|---|---|---|
| Branches: | Usually single, occasionally two arising at same point on conidiophore. Length 20–40$\mu$ occasionally vestigial. Width 3–4$\mu$ | |
| Metulae: | Usually two, occasionally three per branch. Length 5–10$\mu$, usually 10$\mu$ Width 2–5$\mu$ as some are swollen in center. | |
| Phialides: | One or two per metula, typical bottle shape. Length 4–8$\mu$ Width 2–3$\mu$ | |
| Conidia: | Short chains up to 60$\mu$ in length usually 25–30$\mu$ Subglobose 2.5–3.5$\mu$ × 2.0 – 3.0$\mu$ smooth walled | |

| I. 195 Medium | Malt Extract Agar (Oxoid) | Czapek Dox (modified) Agar (Oxoid) |
|---|---|---|
| Growth conditions | 10 days at 25°C | 10 days at 25°C |
| Colony Characteristics | | |
| Rate of growth | 4.5–5.0 cm in 10 days | 3.5–4.0 cm in 10 days |
| Character of growth | Floccose center 3.0–5.0 mm, then velvety. Many radial furrows | As on M.E.A. Many radial furrows |
| Margin | Entire | Crenate |
| Amount of sporulation | Very sparse, almost sterile | As on M.E.A. |
| Color | White | White center, occasional faint yellow margin |
| Exudate | Absent | Absent |
| Odor | Very little | Very little |
| Reverse | White to light brown, no pigment produced | Pale yellow, faintly yellow pigment |
| Conidial stage | | |
| Penicilli: | Asymmetrical length (branch to phialides) 20–50$\mu$ | |
| Conidiophore: | Smooth walled approx. 2–300$\mu$ arising from aerial hyphae. Width 2–3$\mu$ | |
| Branches: | Single arising from several points on conidiophore. Length 5–40$\mu$, often vestigial 5$\mu$ Width 2–3$\mu$ | |
| Metulae: | One per branch, occasionally two. Length 5–10$\mu$ (usually 10$\mu$). Width 3–4$\mu$ often swollen appearance | |
| Phialides: | One per metula, rather restricted in comparison with typical shape. Length 4–8$\mu$ Width 2$\mu$ | |
| Conidia: | Very short chains, one to three spores, occasionally five. Subglobose 3.0–3.5$\mu$ 2.5–3.0$\mu$ smooth walled. | |

The mutant I. 64 (I.M.I. 142,383) has a morphology identical to its parent CI. The mutant I. 156 has a morphology very similar to I. 113 except the colony is yellow-brown to cream in color in contrast to the pale green color of I. 113.

The temperature of incubation is in general between 25° and 35°C., preferably around 30°C.

Inoculation resulting in commencement of the process is best carried out by a pregerminated seed stage comprising for example from 2 to 10 percent of inoculum, usually in the range 5 to 10 percent.

The pH of the substrate medium during incubation is preferably kept within a suitable range supporting maximum growth, for example, between 4 to 7.

The period of growth in batch culture is usually found to range from 20 to 48 hours. In certain instances for example when the carbohydrate is in the form of lactose the time may be extended to 72 hours. In both batch and continuous processes aeration and agitation should be carried out to provide a sufficient level of dissolved oxygen to overcome oxygen deficiency which is a limiting growth factor.

As will be well understood by those skilled in the art sufficient quantities of essential growth nutrients such as nitrogen, sulphur, phosphorus and other trace elements are maintained in the substrate medium so that growth of the substance is limited only by the carbohydrate available to the fungus.

In addition to the nutrients stated above, the presence of one or more vitamins such for example as biotin may be desirable to maintain maximum growth rate.

It is also desirable to add a non-toxic antifoaming agent to the substrate medium to control foaming during the fermentation.

The substance produced according to the present invention may be isolated in any suitable manner known in the art. Thus the resultant mycelium may be recovered by separation, washing, filtration and drying. In this connection, however, it has been found that if the moisture content of the substance is reduced below a critical level of about 50 percent (w/w) by filtration under pressure the subsequent drying methods employed are not subjected to such stringent temperature limitations which is an important factor in the economic processing of these materials. The method of drying must not cause damage to the nutritional value of the mycelium and may be drying in a current of air at 75°C. or freeze drying.

The fungal mycelium produced by the process of the present invention shows very good water binding capacity and may be useful as a thickening and gelling agent. Not being an isolate, it retains its vitamins as well as other nutritionally available materials such as lipids and some carbohydrates. Fungal mycelium has satisfactory baking characteristics which are of value in protein enriched breads, breakfast foods and food snacks. The fungal mycelium, because of its filamentous structure, can be baked, fried or puffed into a rice-like article and presented to many communities as a food comparable in appearance and acceptability with conventional foods which they are accustomed to eating.

Following is a description by way of example of methods of carrying the invention into effect.

EXAMPLE 1

10 Liters of the following culture medium were prepared sterilised in a stirred fermenter vessel.

| Cane molasses to provide 6% w/v sugar | |
|---|---|
| Ammonium sulphate | 1.2% |
| Potassium dihydrogen phosphate | 0.3% |
| Calcium carbonate | 1.0% (to control pH, otherwise gaseous ammonia could be used on automatic control) |
| Tap water | |
| Antifoam: Polypropylene glycol 2000 – 2 ml. was added to prevent foam formation | |

An inoculum equivalent to 5–10 percent by volume of the culture medium and grown either on a glucose/corn steep liquor salts medium or other suitable nutrients in shake flasks was inoculated with a spore suspension of the organism, comprising our strain of *Penicillium notatum-chrysogenum*, C1, for 18 to 24 hours at 30°C. on a rotary shaker.

The fermenter incubated at 30°C. was then stirred at 800 rpm with a disc turbine and 1 VVM of sterile air passed through. In 30 to 40 hours, the grown mycelium was removed from the fermenter, centrifuged, washed with water and dried in a current of air at 75°C.

EXAMPLE 2

This is an example of a starch preparation using potatoes as the starch source.

Washed potatoes were placed with water in a jacketed stirred vessel, brought to boiling with stirring and boiled until the whole was a uniform mash. The temperature was then reduced to 65°C., pH adjusted to 6.0–6.5 and heat stable bacterial α-amylase added and the stirring continued. After 20 minutes the liquified material was passed through a sieve in order to remove the potato skins, which are not attacked by the enzyme. This solubilised solution was then adjusted with water to give a solution that contained 6 percent of sugars.

400 l. of the following culture medium were prepared and sterilised in a stirred fermenter vessel:

| Potato (treated as described above to provide) | |
| --- | --- |
| | 6.0% w/v. sugar |
| Ammonium sulphate | 0.25% |
| $KH_2PO_4$ | 0.3% |
| Tap water | |
| Antifoam | soyabean oil (sufficient to prevent excessive foaming) |

The pH was maintained at 5.5 with ammonia solution. The seed inoculum was 10 percent of our strain of *Penicillium notatum chrysogenum* C1-(IMI 138291). The fermenter with temperature controlled at 30°C. was stirred at 306 r.p.m. with two 28.5 cm. disc turbine impellers. Aeration was at 1VVM of sterile air and the vessel operated at 30 p.s.i.g. After 30 hours the resultant mycelium was recovered by separation, washing, filtration and drying.

| Analysis | Total Nitrogen (Kjeldahl) | 6.90% |
| --- | --- | --- |
| | α Amino Nitrogen | 5.27% |

Sulphur amino acids represent 3.40 percent of the total amino acids.

EXAMPLE 3

400 l. of the following culture medium were prepared and sterilised in a stirred fermenter vessel.

| Cane molasses to provide | 6.0% w/v sucrose |
| --- | --- |
| Ammonium sulphate | 0.25% |
| $KH_2PO_4$ | 0.20% |
| Corn steep liquor (50% TS) | 1.0% |
| Antifoam | Polypropylene glycol 2000 (sufficient to prevent excessive foaming) | pH controlled at 5.5 by addition of ammonia solution. The process and other conditions were as described in Example 2. After 26 hours the resultant mycelium was recovered as in Example 2.

| Analysis | Total Nitrogen (Kjeldahl) | 6.81% |
| --- | --- | --- |
| | α Amino Nitrogen | 5.41% |

Sulphur amino acids represent 2.37 percent of the total amino acids.

EXAMPLE 4

400 l. of the following culture medium were prepared and sterilised in a stirred fermenter vessel.

| Spray dried milk whey (7% w/v) (to provide) | 6.0% w/v lactose |
| --- | --- |
| Corn steep liquor (50% TS) | 0.4% |
| Ammonium sulphate | 0.4% |
| $KH_2PO_4$ | 0.2% |
| Tap water | |
| Antifoam | Polypropylene glycol 2000 (sufficient to prevent excessive foaming) | pH 5.5 (no control required). The process and other conditions were as described in Example 2. At approximately 72 hours mycelium was recovered as in Example 2.

| Analysis | Total Nitrogen (Kjeldahl) | 7.38% |
| --- | --- | --- |
| | α Amino nitrogen | 5.54% |

Sulphur amino acids represent 4.31 percent of the total amino acid.

8 l. of the following culture medium were prepared and sterilised and added to a sterile fermenter.

| Glucose | 2.80% w/v |
| --- | --- |
| Corn steep liquor (50% TS) | 0.50% v/v |
| $KH_2PO_4$ | 0.20% w/v |
| $(NH_4)_2SO_4$ | 0.25% w/v |
| Antifoam | Polypropylene glycol 2000 (sufficient to prevent excessive foaming) | pH maintained at 5.0 with gaseous ammonia. The seed inoculum was 10 percent of our strain of *Penicillium notatum chrysogenum* I.113 (IMI 142385). The fermenter temperature was controlled at 30°C. The fermenter was stirred at speeds of up to 800 r.p.m. with slow increase of the stirrer speed during the course of the batch to maintain the level of dissolved oxygen in the culture at a non-growth limiting concentration. The impeller was a single disc-turbine impeller of 11.5 cm. diamter. Aeration was at 1 VVM. After 25.5 hours a sample of the mycelium gave, on a dry weight basis a total Nitrogen of 7.51 percent.

EXAMPLE 6

The procedure of Example 5 was repeated with the exception that the culture used was our strain of *Penicillium notatum chrysogenum* I.195 )IMI 142386) and the pH was controlled at 6.0. After 20.5 hours a sample of the mycelium gave, on a dry weight basis, a total Nitrogen of 7.53 percent.

Our strain of *Penicillium notatum chrysogenum* C1 and the variants thereof may be replaced in the above examples by other strains of *Penicillium notatum* and *Penicillium chrysogenum* and *Penicillium notatum chrysogenum* that are non-toxic and contain no other undesirable metabolites such for example as the antibiotic penicillin.

We claim:
1. A nonviable penicillin free fungal mycelium fermentation product possessing a high net protein utilization value on rat assays of at least 70 based on the α-amino nitrogen, characterized by being penicillin free during its growth and containing a non-toxic strain of *Penicillium notatum* or *Penicillium chrysogenum*.

* * * * *